(12) United States Patent
Maynard et al.

(10) Patent No.: US 6,283,188 B1
(45) Date of Patent: *Sep. 4, 2001

(54) CARD LAMINATING APPARATUS

(75) Inventors: Raymond Maynard, Westerly; Christian S. Rothwell, North Kingstown, both of RI (US)

(73) Assignee: Atlantek, Inc., Wakefield, RI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/160,902

(22) Filed: Sep. 25, 1998

(51) Int. Cl.[7] ............................ B32B 31/00; B30B 3/00
(52) U.S. Cl. ...................... 156/521; 156/351; 156/364; 156/563; 156/583.1
(58) Field of Search ...................... 156/353, 361, 156/543, 559, 556, 521, 555, 517, 519, 264, 256, 263, 354, 270, 583.1, 351, 364, 563

(56) References Cited

U.S. PATENT DOCUMENTS

| 4,585,509 | * | 4/1986 | Obayashi | 156/497 |
| 5,413,651 | * | 5/1995 | Otruba | 156/64 |
| 5,637,174 | * | 6/1997 | Field et al. | 156/256 |
| 5,653,846 | * | 8/1997 | Onodera et al. | 156/362 |
| 5,783,024 | | 7/1998 | Forkert | 156/256 |

* cited by examiner

Primary Examiner—Linda Gray
(74) Attorney, Agent, or Firm—Barlow, Josephs & Holmes, Ltd.

(57) ABSTRACT

A two-sided card laminating apparatus simultaneously applies and bonds laminate sheets to opposing faces of a two-sided card substrate. The apparatus includes two opposing laminating assemblies symmetrically mounted in mirror image relation on opposing sides of a substrate supply path. Individual sheets of laminate are cut from webs of lamina and transferred onto the card substrate at a convergence zone disposed on the substrate supply path. Each of the laminating assemblies includes a web of lamina, a cutter, and nip rollers disposed between the web and the cutter. The nip rollers advance the web in an upstream direction through the cutter into engagement with a transfer roller. As the laminate exits the cutter, the leading edge is captured between the outer surface of the transfer roller and a laminate guide where it is grabbed by the outer surface of the transfer roller. The outer surface of the transfer roller pulls the leading edge of the sheet of laminate in an upstream direction from the cutter toward the convergence zone. A transfer member disposed in the convergence zone strips the leading edge of the sheet of laminate from the outer surface of the transfer roller and transfers the sheet of laminate into overlying registration with the substrate as the substrate passes through the convergence zone. The substrate is transported along the substrate supply path through the convergence zone and between the two opposing heaters which symmetrically heat the card substrate to bond the laminate sheets to the card substrate.

20 Claims, 12 Drawing Sheets

CARD LAMINATING APPARATUS

BACKGROUND AND SUMMARY OF THE INVENTION

The instant invention relates to apparatus used in the production of identification cards, and more particularly relates to apparatus for applying a protective, transparent laminate sheet to the surface of a plastic card substrate to protect identification information printed on the surface of the plastic card and to further provide resistance to tampering of the information.

It is well known that laminated cards are widely used for identification cards, licenses, etc. In the past, identification cards were typically formed by printing identifying information on a paper based substrate and bonding the paper based substrate between two thick transparent protective sheets. The transparent sheets protected the printed information from the wear and tear of handling, as well as from tampering. More recently, significant use has been made of durable, polymer based materials for card substrates wherein the printed information is printed directly onto the card substrate. From a security and durability standpoint it is necessary to protect the printed information with a transparent overlay or laminate much like the earlier paper based identification cards. However, the new security laminates are much thinner because the plastic card substrates provides all of the necessary rigidity. As with their paper ancestors, the transparent laminate sheets can be provided with watermarks or security features to insure the security and authenticity of the card.

Apparatus for applying a laminate sheet to the surface of a card substrate has heretofore been known in the art. In this regard, the U.S. Pat. No. 5,783,024 to Forkert represents the closest prior art to the subject invention of which the applicant is aware. Forkert discloses a single-sided laminating apparatus effective for applying a sheet of laminate film onto a single side of a card substrate. The apparatus comprises a lamina supply roll capable of holding a supply of lamina from which successive sheets of lamina can be cut with a cutting device. A cut sheet of laminate is aligned with the card and passed under a heated roller to bond the laminate sheet the card substrate. While the Forkert apparatus is effective for its intended purpose, it has several shortcomings which make its practical implementation and use difficult. The first shortcoming is that the apparatus is effective only for a single-sided lamination during each pass of the substrate through the apparatus. While this does immediately appear to be a shortcoming, there are several mechanical, chemical and practical issues to consider. A first issue is that cards are often printed on both sides, and therefore it is desirable to place a protective laminate film on both sides of the card. This can only be achieved in the Forkert apparatus by running the card through the apparatus two separate times. In high volume applications, such as the issuance of driver's licenses, where time is an issue, the need to laminate the card twice is an obvious time constraint to the quick and efficient production of the cards. A second issue is that the laminate film tends to shrink upon the application of heat, thus causing the card to curl upwardly on the side with the laminate film overlay. The amount of curl is dependent upon the physical properties of the laminate which can vary from roll to roll even within the same batch of material. Forkert took this factor into consideration and provided a mechanical card straightener to provide a reverse bend in the card. However, the card straightener adds to the complexity of the device. Furthermore, because of variations in the laminate sheet, the amount of curl is not always the same, and thus the straightener is not always effective for applying the correct amount of reverse bend. Another shortcoming of the Forkert device is the nature of the lamina film transfer mechanisms. The lamina used to laminate the subject cards is very thin and difficult to handle in sheet form. Forkert utilizes sets of nip rollers to successively push the cut laminate sheets toward the convergence zone. Wire guides maintain the laminate on a lamina supply path. In practice, it is difficult to push this type of laminate beyond a set of nip rollers when there is any type of guide since the laminate material naturally tends to adhere to the guide members.

The instant invention provides an improved card laminating apparatus which is effective for simultaneously applying laminate sheets to both upper and lower sides of a card substrate and for bonding the laminate sheets to the card substrate using a pair of symmetrically aligned heated rollers. Symmetric heating of both sides of the card reduces lamination to a single step, reduces substrate curling due to uneven heating, and eliminates the need for a mechanical card straightener. The improved apparatus further provides a unique drive assembly for pulling the laminate through the apparatus to insure proper laminate registration and tracking and a unique transfer assembly for applying the laminate sheets to both sides of the card.

More specifically, the apparatus includes two identical laminating assemblies that are symmetrically mounted in mirror image relation on opposing sides of a substrate supply path along which the card substrate travels. Individual sheets of laminate are cut from webs of lamina and transferred onto the card substrate at a convergence zone where the sheets of laminate are brought together in overlying registration with the substrate. Each of the laminating assemblies includes a web of lamina mounted in a cassette, a cutter capable of cutting sheets of laminate from the web, and nip rollers disposed between the web and the cutter. The idle roller of the pair of nip rollers is formed as part of the cassette to ease loading of the web of lamina into the apparatus. When the cassette is mounted on the frame, the idle roller engages with the drive roller to form the nip. The nip advances the web of lamina in an upstream direction through the cutter. Each laminating assembly further includes a transfer roller and laminate guide disposed between the cutter and the convergence zone. As the lamina is advanced through the cutter, the leading edge of the web is captured between the outer surface of the transfer roller and a laminate guide. The laminate guide member and the outer surface of the transfer roller cooperate to form an arcuate laminate supply path with the transfer roller pulling the leading edge of the web of lamina in an upstream direction from the cutter to the convergence zone. A transfer member disposed in the convergence zone strips the leading edge of the sheet of laminate from the outer surface of the transfer roller and transfers the sheet of laminate into overlying registration with the substrate as the substrate passes through the convergence zone. A heater is disposed downstream of the convergence zone.

Each of the laminating assemblies further includes a lamina sensor for sensing the leading edge of the web of lamina and a unique drive assembly operative for integrated rotation of the nip rollers and the transfer roller. The drive assembly comprises a drive motor, and a gear train interconnecting the drive motor with the transfer roller and the drive roller of the nip rollers. The gear train is constructed and arranged to rotate the outer surface of the transfer roller at a greater speed than the outer surface of the drive roller of the nip rollers such that the transfer roller pulls the web along the lamina supply path faster than the drive roller pushes the web. The drive roller of the nip rollers includes a one-way clutch which allows free rotation of the drive roller only in the downstream direction. This arrangement prevents the nip rollers from advancing the web too quickly, allows the transfer roller to pull the web through the lamina supply path rather than pushing the lamina, and also provides a gap between the trailing edge of the cut sheet of laminate and the leading edge of the web. The gap allows the lamina sensors to more accurately detect the leading edge of the web and to stop rotation of the transfer roller at the proper time.

The substrate is automatically transported along the substrate supply path by successive pairs of nip rollers which pass the substrate between the respective transfer members of the laminating assemblies and between the heaters wherein the laminate sheets are bonded to the substrate.

During operation of the apparatus, a web of lamina is advanced downstream by the nip rollers where it is captured by the transfer roller. As described above, the transfer roller is driven at a greater speed than the nip rollers wherein the transfer roller now pulls the web of lamina faster than the nip rollers advance the web. The lamina sensor is positioned on the circumference of the transfer roller at a position wherein the distance between the sensor and the cutter equals the required length of the sheet of the laminate. When the sensor senses the leading edge of the lamina, rotation of the transfer roller and nip rollers is stopped, and the cutter actuated to sever a sheet of laminate from the web. The operation is identical for both laminating assemblies. When both sheets of laminate are ready for transfer, the substrate is inserted into the substrate transport and advanced along the substrate supply path. When a substrate sensor detects the leading edge of the substrate, the drive assembly is energized and rotation of the transfer roller and nip rollers resume. The timing of advancement of the substrate and rotation of the transfer rollers is such that the leading edges of the laminate reach a convergence point at the same time as the leading edge of the substrate. As the transfer rollers continue to rotate, the stripper fingers on the transfer members strip the laminate sheets from the surface of the transfer rollers and force the laminate sheets into overlying relation with the substrate. Since the nip rollers are driven by the same motor as the transfer roller, the nip rollers are also advancing the web until the leading edge of the web is captured by the input portion of transfer roller. The drive assembly continues to operate until the lamina sensor detects the leading edge of the lamina. Thereafter, the drive motor is shut off and the cutter severs the web to form a new sheet of laminate. As indicated above, since the transfer roller advances faster than the nip rollers advance the web, a small gap if formed between the trailing edge of the sheet of laminate being transferred and the new web of lamina being fed. As the substrate exits the convergence zone, the leading edge of the substrate is immediately captured between two heated nip rollers to heat bond the laminate sheets to the substrate. The heated nip rollers include a non-rotating heated core and a rotating outer surface. The heaters are symmetrically positioned in mirror image relation to form a nip.

Accordingly, among the objects of the instant invention are: the provision of a two-sided card laminating apparatus; the provision of a two-sided card laminating apparatus that simultaneously laminates both sides of a substrate; the provision of such a laminating apparatus which provides even heating of the laminate sheets to reduce curling of the substrate; the provision of such a card laminating apparatus wherein two mirror image laminating assemblies are symmetrically mounted in mirror image relation on opposing sides of a substrate supply path; the provision of such an apparatus wherein the webs of lamina are mounted in cassettes which form part of the advancement nip; the provision of such a card laminating apparatus wherein the laminate sheets are applied to the substrate using transfer rollers; and the provision of such an apparatus wherein the transfer rollers cooperate with a laminate guides to capture the sheets of laminate in a fixed lamina supply path.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Figure 1:
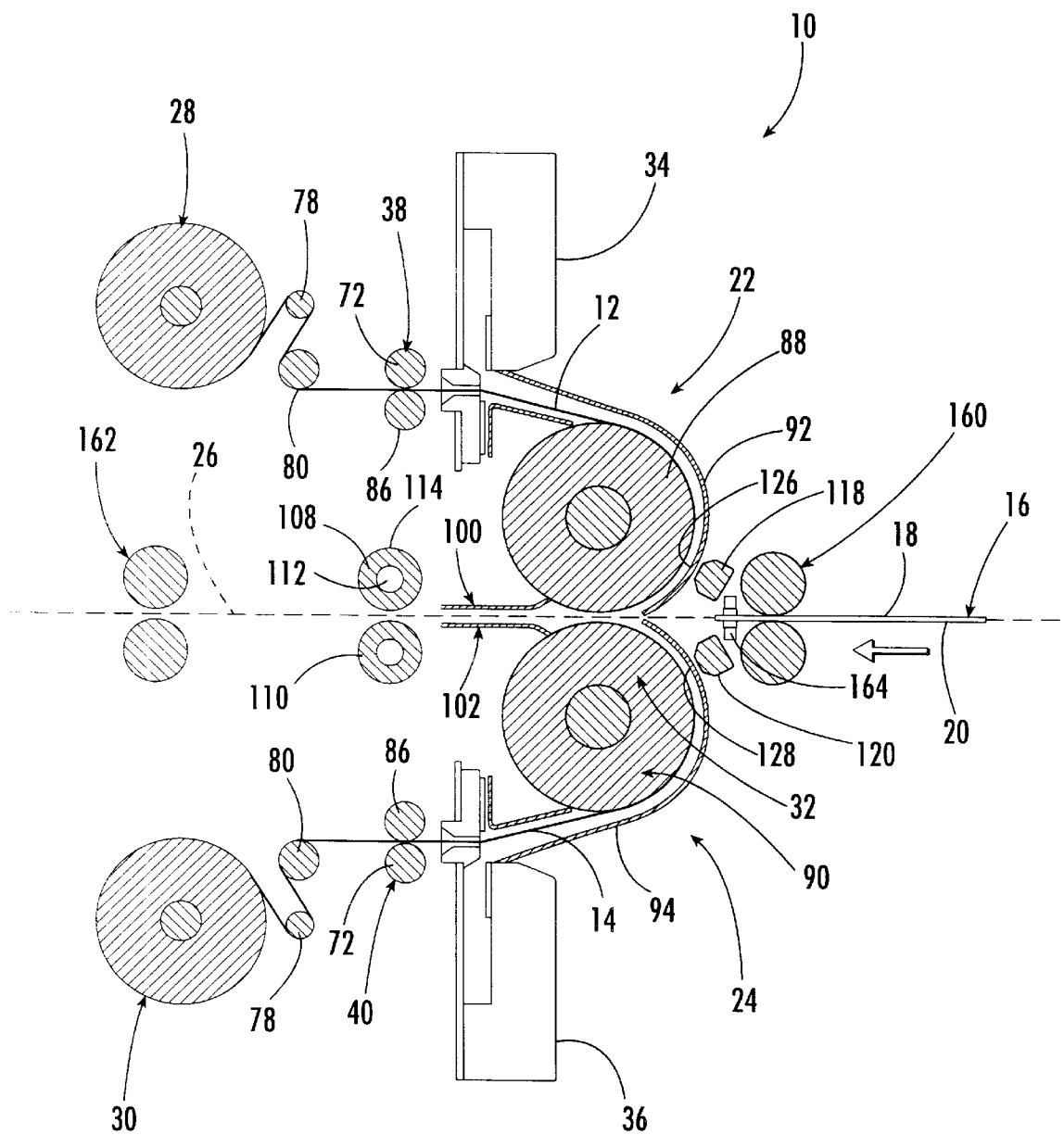
FIG. 1 is a plan view of a card laminating apparatus constructed in accordance with the teachings of the present invention.
Figure 2:
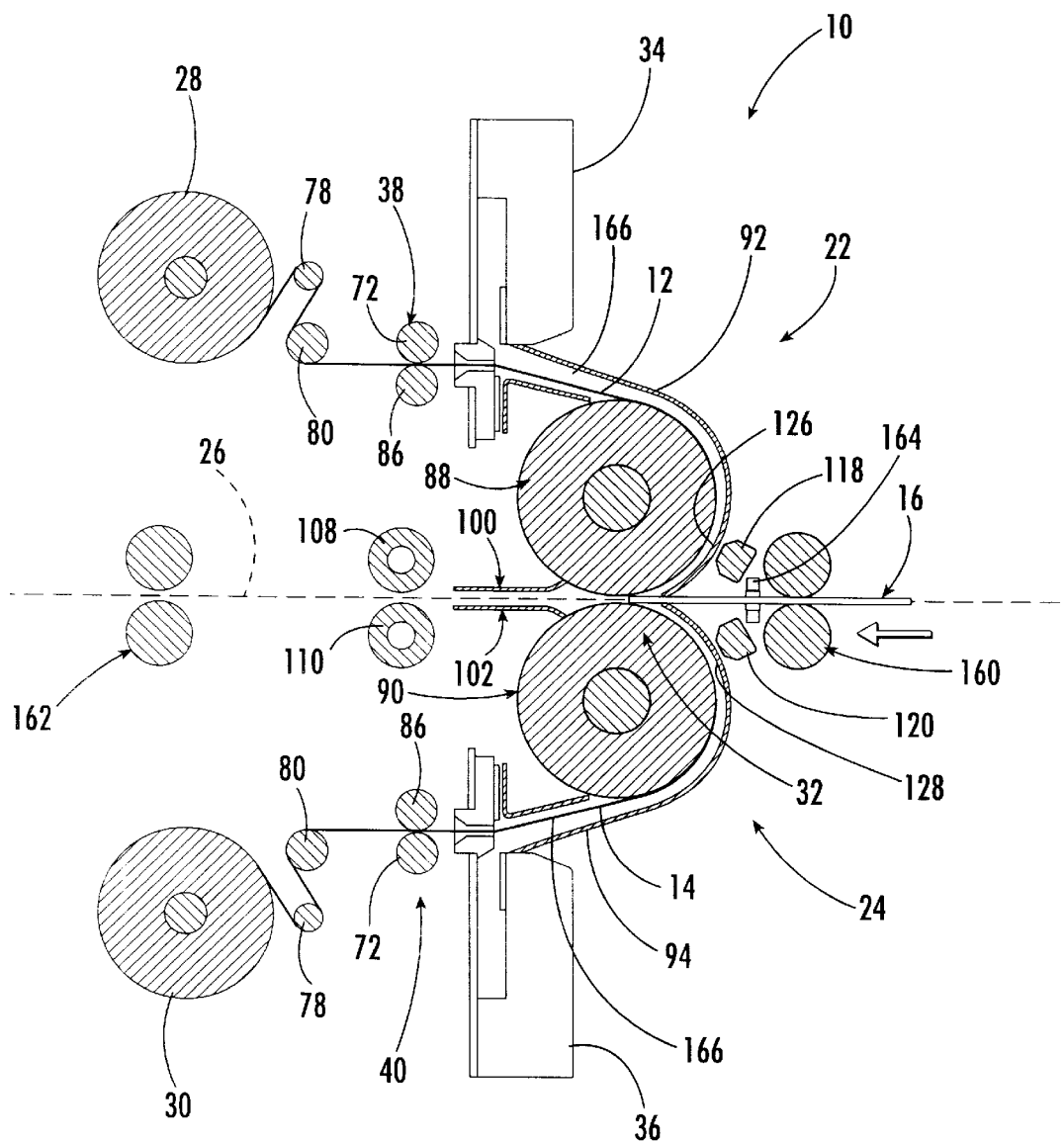
FIG. 2 is another plan view thereof showing entry of the card substrate into the convergence zone.

Referring now to the drawings, the card laminating apparatus of the instant invention is illustrated and generally indicated at 10 in FIGS. 1–12. As will hereinafter be more fully described, the instant card laminating apparatus 10 is effective for simultaneously applying laminate sheets 12, 14 to upper and lower sides of a card substrate 16, and for bonding the laminate sheets 12, 14 to the card substrate 16 using a pair of symmetrically aligned heated rollers.

Figure 5:
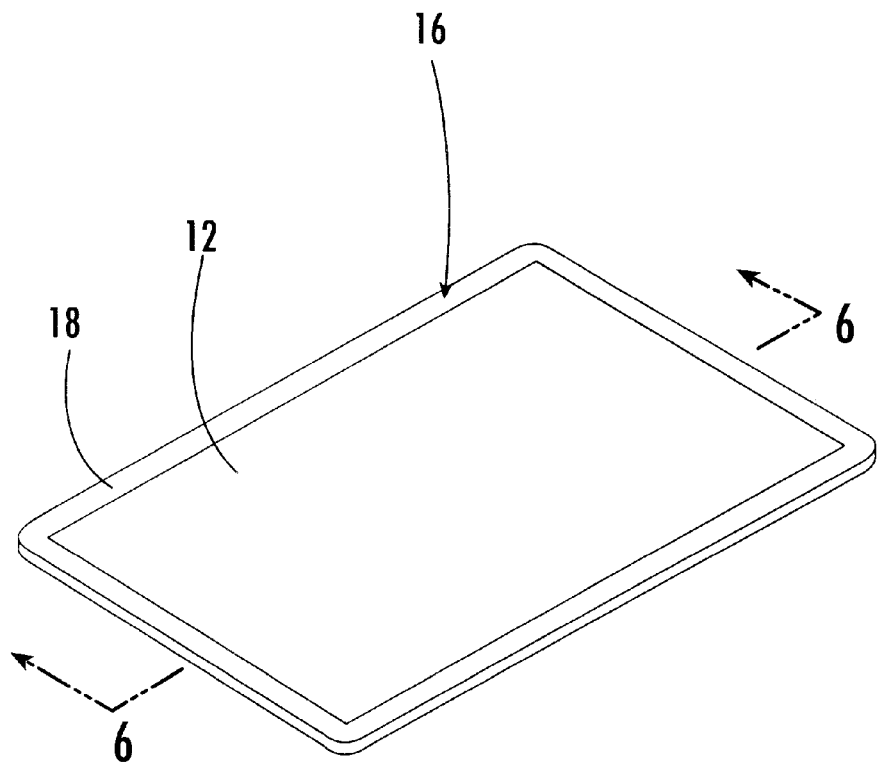
FIG. 5 is a perspective view of the laminated card.
Figure 6:
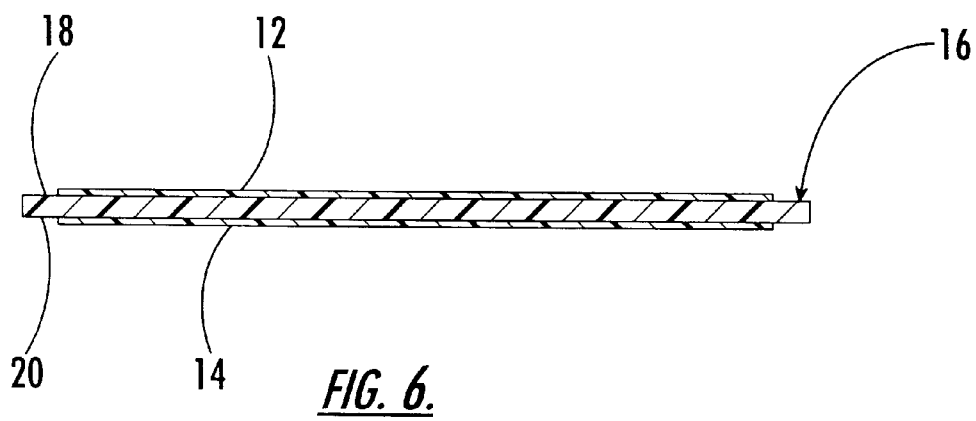
FIG. 6 is a cross-sectional view thereof as taken along line 6—6 of FIG. 5.

Referring to FIGS. 5 and 6, the substrate 16 preferably comprises an ISO standard CR-80 type rectangular plastic card 2⅛ wide and 3⅜ inches in length. The substrate 16 has upper and lower surfaces 18, 20 upon which identifying information has been printed (not shown).

Turning back to FIGS. 1–4, the apparatus 10 comprises two identical laminating assemblies generally indicated at 22, 24 that are symmetrically mounted in mirror image relation on a frame 25. More specifically, the assemblies 22, 24 are mounted in mirror image relation on opposing sides of a linear substrate supply path 26 (shown in broken line) along which the card substrate 16 travels. Individual sheets of laminate 12, 14 are cut from webs of lamina 28, 30 and transferred onto the card substrate 16 at a convergence zone generally indicated at 32 where the sheets of laminate 12, 14 are brought together in overlying registration with the substrate 16. Each of the laminating assemblies 22, 24 includes its respective web of lamina 28, 30, a cutter 34, 36 which is capable of cutting sheets of laminate 12, 14 from the web 28, 30, and a pair of nip rollers generally indicated at 38, 40 disposed between the respective web and cutter.

The webs of lamina 28, 30 are each mounted in a respective cassette 42, 44 which holds the lamina and simplifies loading of the lamina into the apparatus. One of the critical user problems with web based devices is that the web media is difficult to thread through nips and other guides. The cassette arrangement simplifies loading of the lamina into the apparatus. Since both cassettes 42, 44 and webs of lamina 28, 30 are identical, the description thereof will proceed only with regard to a single unit, i.e. unit 42. The web of lamina 28 is initially provided in roll form on a tube 46. The cassette 42 comprises upper and lower housing portions 48, 50 which are received and secured together to form a generally cylindrical body portion 52 and an output portion 54. The upper and lower housing portions 48, 50 are hinge mounted on a hinge pin 58 to form a clamshell assembly. The housing portions 48, 50 are movable between an open position (not shown) wherein the web 28 can be installed in the interior and closed position as shown in the drawings. End portions of the tube 46 engage with semicircular cut-outs 60, 62 in the side walls 64, 66, and 68, 70 of the upper and lower housing sections 48, 50 respectively to rotatably support the web 28 in the cassette 42. The idle roller 72 of each pair of nip rollers 38, 40 is formed as part of the cassette to ease loading of the web of lamina into the apparatus. The idle roller 72 comprises a plastic cylinder 74 which is mounted on a shaft 76 which is in turn rotatably supported between two opposing side walls 64, 66 of the upper housing portion 48. The lamina is threaded over a wall 78 of the cassette body, under an idle roller 80, and between upper and lower guide plates 82, 84 supported between the opposing sidewalls 64, 66 and 68, 70 of the upper and lower housing portions 48, 50. When the cassettes 42, 44 are mounted on the frame 25, the idle rollers 72 engage with a corresponding drive roller 86 mounted on the frame 25 to form the respective nip 38, 40. The nips 38, 40 rotate to advance the webs of lamina 28, 30 in an upstream direction through the respective cutters 34, 36.

The cutters 34, 36 are conventional guillotine cutters which are commercially available through various vendors. The cutters are selected for size and mounting configuration to best suit the arrangement of this particular implementation. Further description of the cutters is not believed to be necessary.

Each laminating assembly 22, 24 further includes a transfer roller generally indicated at 88, 90 and a laminate guide member generally indicated at 92, 94. The transfer rollers 88, 90 and guides 92, 94 are disposed between the respective cutters 34, 36 and the convergence zone 32. As the lamina 28, 30 is advanced through the cutter 34, 36 by the nip rollers 38, 40, the leading edge of the web 28, 30 is captured between the outer surface of the transfer roller 88, 90 and the upper end of the laminate guide member 92, 94. The transfer rollers 88 each comprise a cylindrical core 96 and plurality of resilient O-rings 98 mounted on the exterior surface of the core 96 extending around the circumference of the core 96. The O-rings 98 are preferably fabricated from a resilient material, such as rubber, and preferably project above the outer surface of the core 96. The O-rings 98 function to frictionally grab the lamina and maintain the lamina in spaced relation from the surface of the roller cores so that transfer member 100, 102 disposed in the convergence zone 32 can easily strip the leading edge of the sheet of laminate from the outer surface of the respective transfer roller. Once captured by the O-rings 98, the transfer roller pulls the leading edge of the web of lamina in an upstream direction toward the convergence zone.

The laminate guide members 92, 94 comprise a thin sheet of spring metal formed in an arc corresponding to the outer surface of the transfer rollers 88, 90. The laminate guide is mounted in closely spaced relation to the surface of the transfer roller wherein the laminate guide member and the outer surface of the transfer roller cooperate to form an arcuate laminate supply path extending from the cutter to the convergence zone.

The transfer members 100, 102 each comprise a planar body portion 104 having a plurality of spaced stripper fingers 106 extending outwardly from a leading edge thereof The stripper fingers 106 are disposed in closely spaced adjacent relation to the outer surface of the core 96 of the transfer roller and are spaced so as to extend between the projecting O-rings 98. In this regard, the terminal ends of the fingers 106 are positioned below the upper level of the O-rings 98 where they can strip the laminate sheet away from the transfer roller as the laminate sheet enters the convergence zone.

Figure 7:
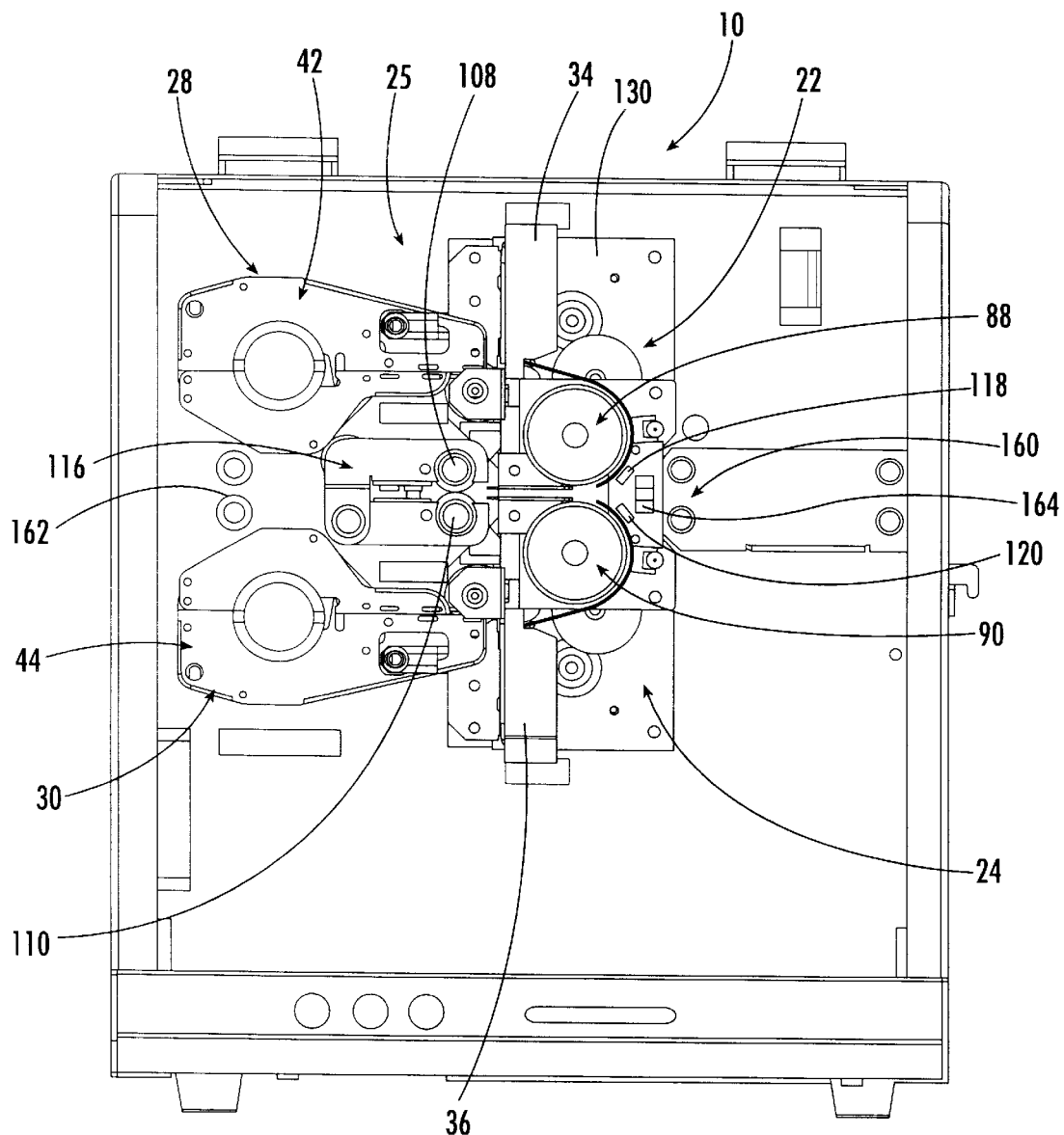
FIG. 7 is a front view of the apparatus.
Figure 8:
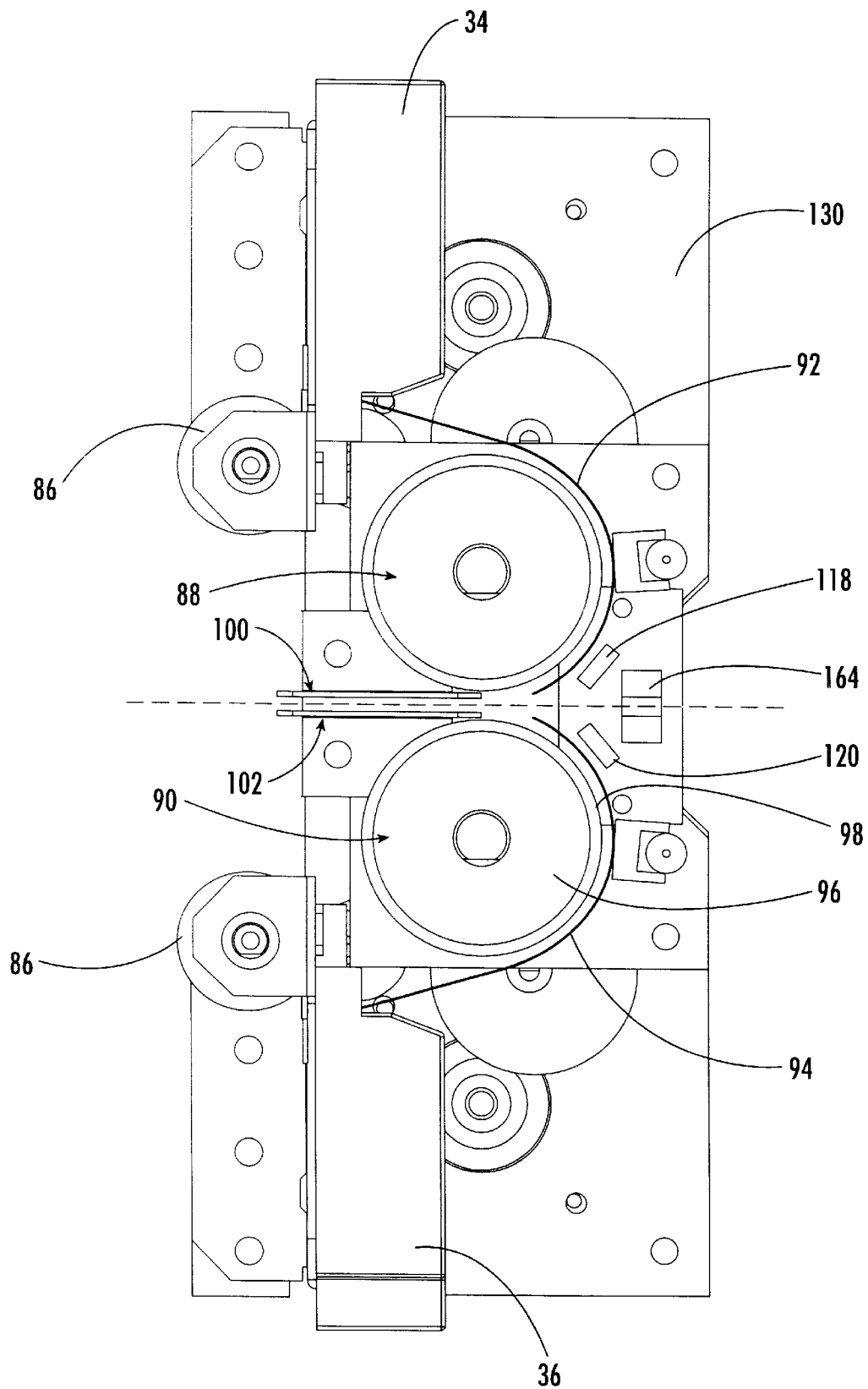
FIG. 8 is an enlarged front view of the transfer assembly with the laminate supply cassettes and the heated nip rollers removed for clarity.
Figure 9:
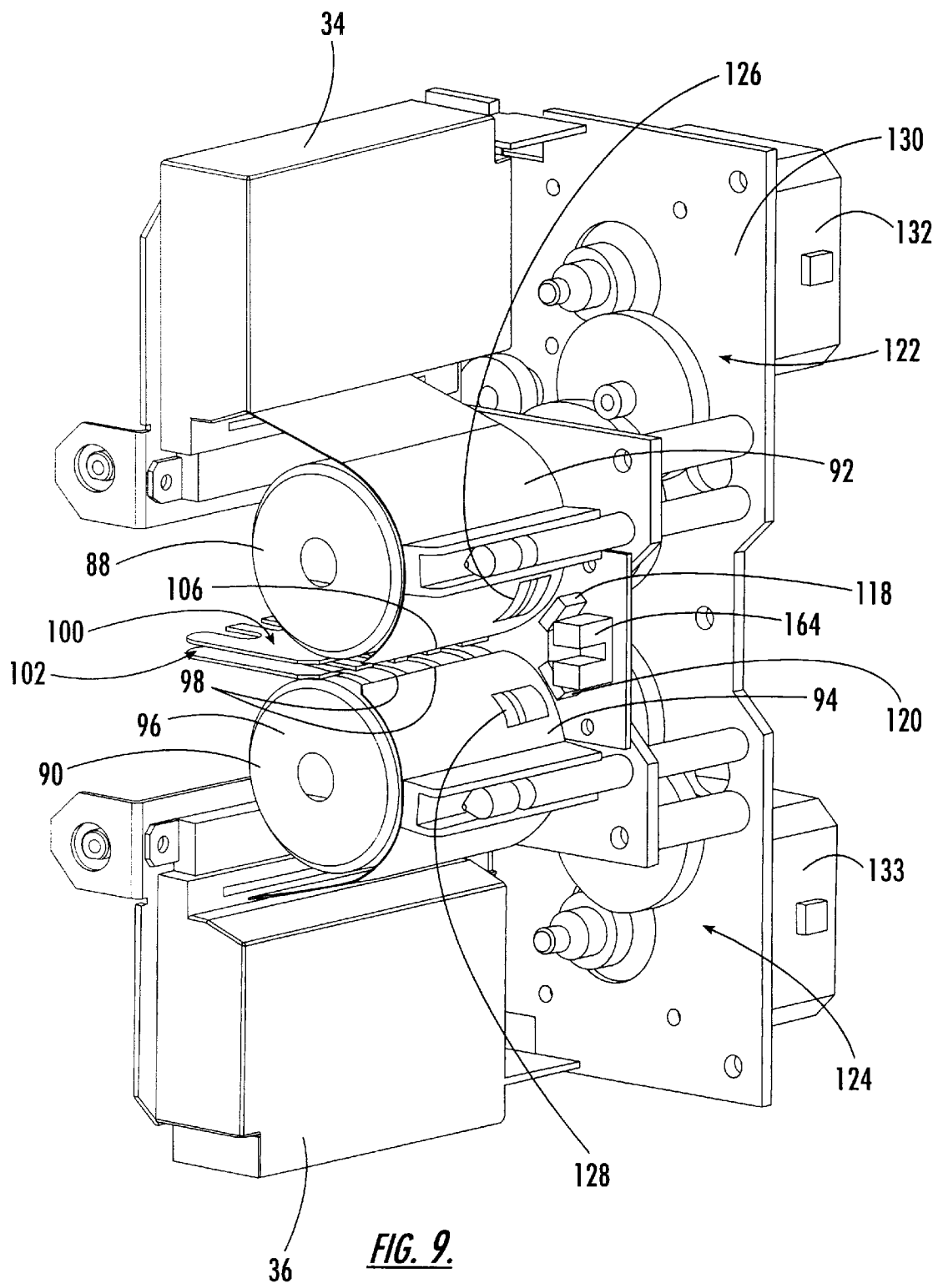
FIG. 9 is a perspective view of the transfer assembly.
Figure 9A:
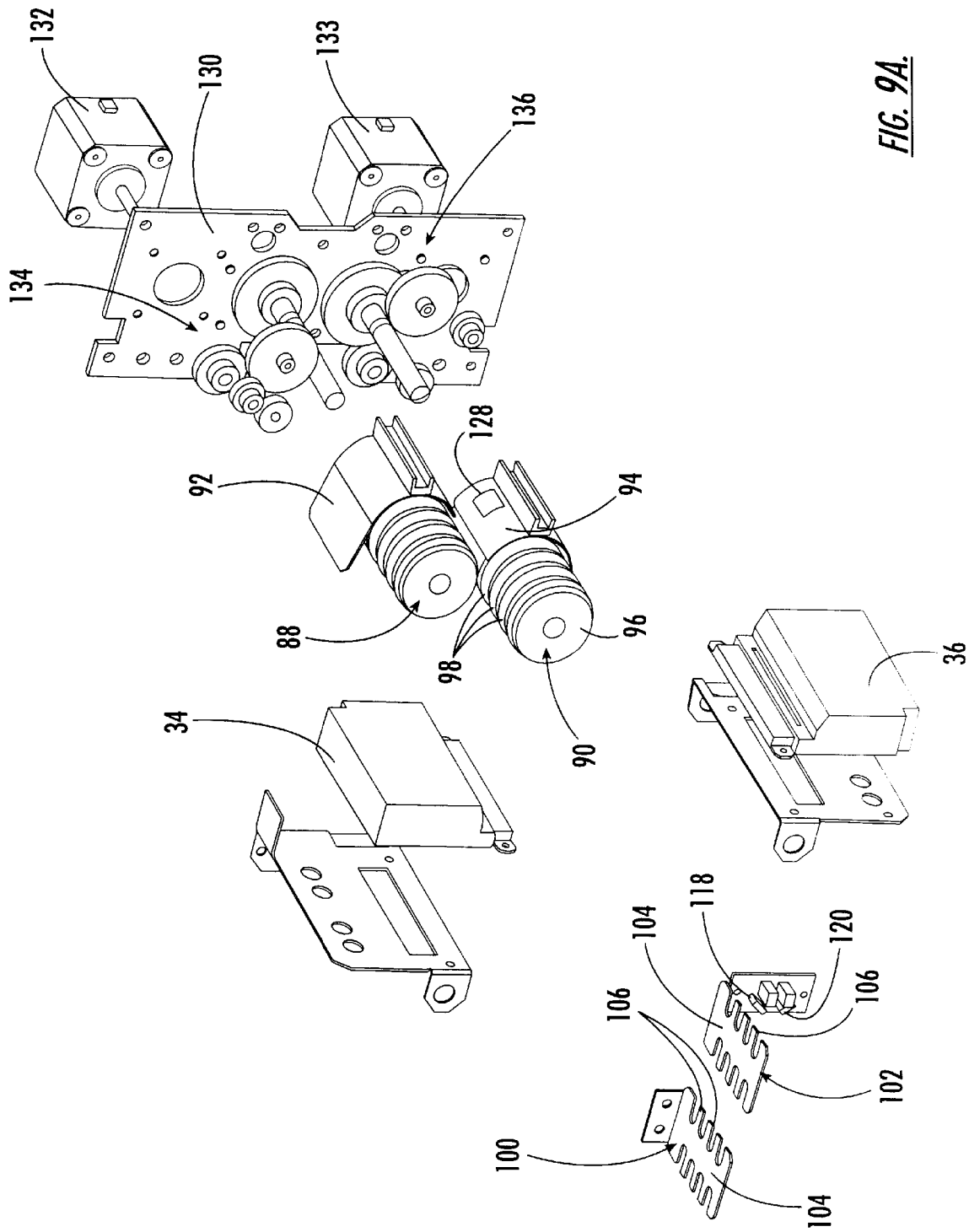
FIG. 9A is an exploded assembly view of the transfer assembly with selected parts removed for clarity.
Figure 10:
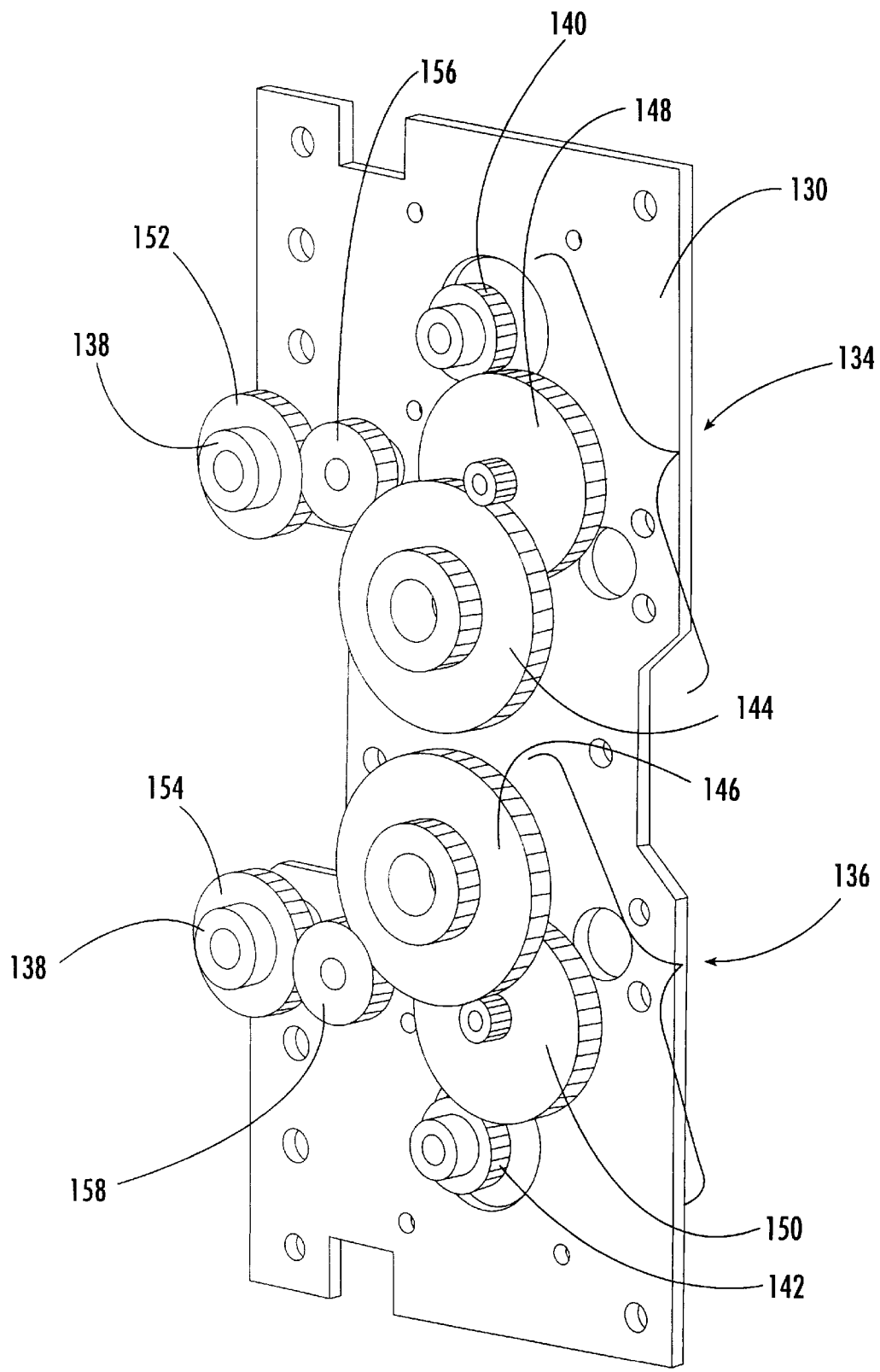
FIG. 10 is a perspective view of the gear drive trains corresponding to the transfer assemblies.
Figure 11:
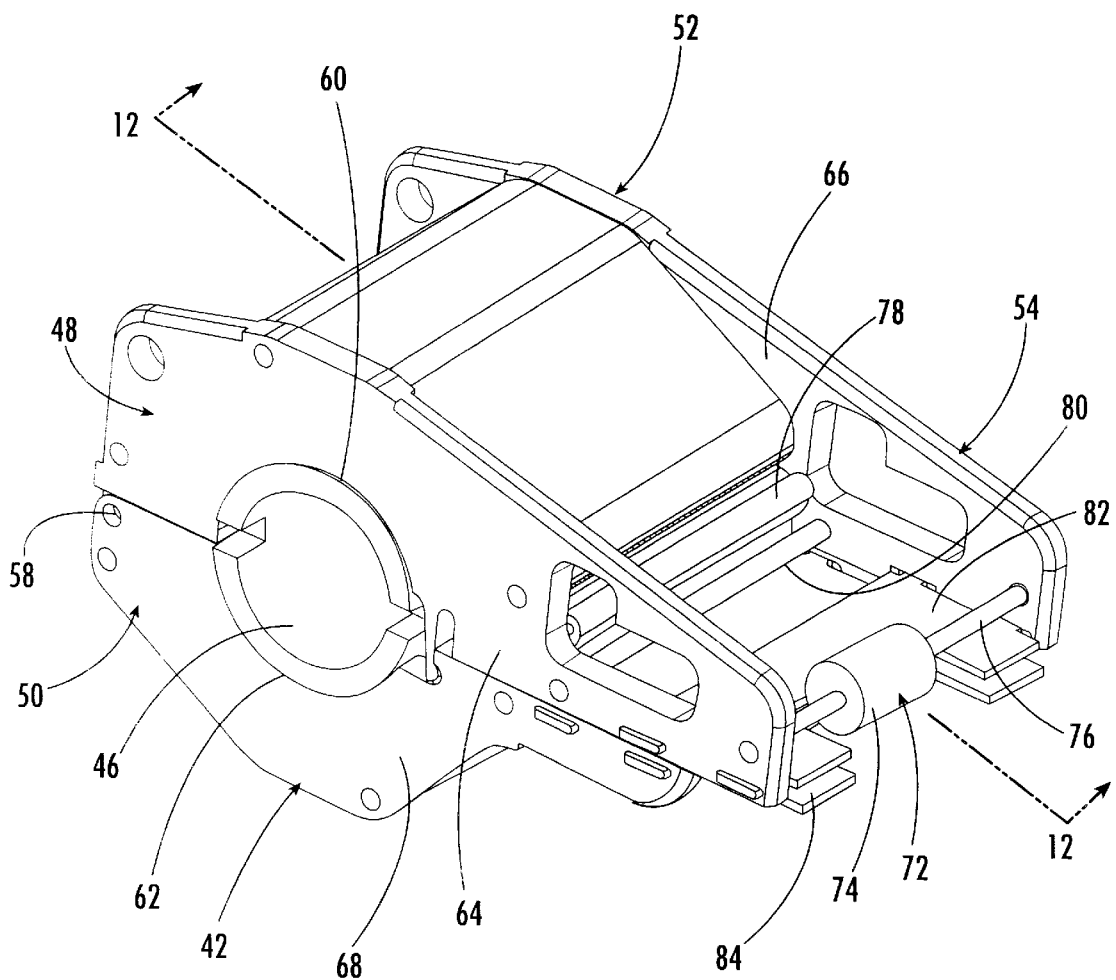
FIG. 11 is a perspective view of a lamina supply cassette.
Figure 12:
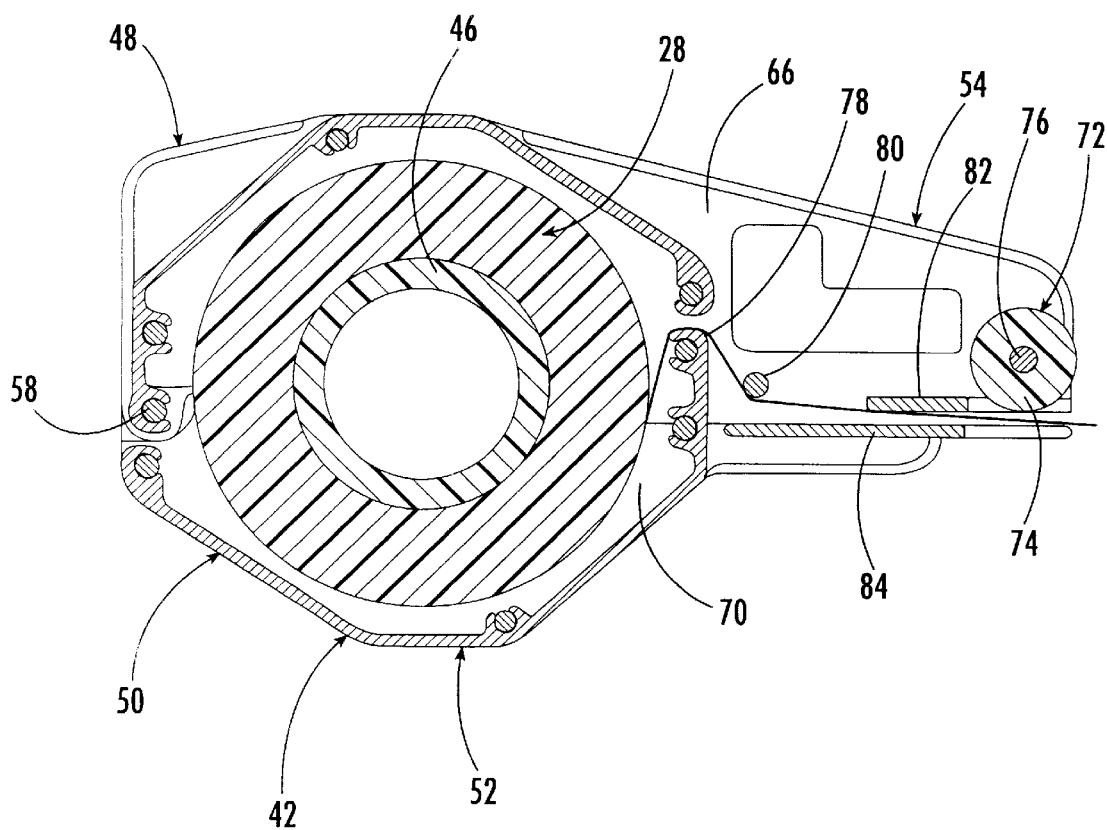
FIG. 12 is a cross-sectional view thereof as taken along line 12—12 of FIG. 11.

Each of the laminating assemblies 22, 24 still further comprises a heated roller 108, 110 respectively disposed downstream of the convergence zone 32. The heated rollers 108, 110 are conventional in the art and comprise a non-rotating core 112 surrounded by a resilient rotating outer surface 114. A cartridge heater (not shown) is mounted into the center of the non-rotating core 114 to heat the roller. As illustrated in FIG. 7, the two heated rollers 108, 110 are mounted together in a hinged housing assembly 116 so that the rollers 108, 110 are positioned in closely spaced opposing relation to form a heated nip which evenly heats both surfaces of the card substrate 16 as it is advanced between the rollers 108, 110.

Each of the laminating assemblies 22, 24 still further includes a lamina sensor 118, 120 respectively operative for sensing the leading edge of the web of lamina 28, 30 and a drive assembly 122, 124 respectively (FIG. 9) operative for integrated rotation of the nip rollers and the transfer roller.

The lamina sensors 118, 120 are mounted outside of the laminate guides 92, 94 and may comprise any suitable sensor operative for detecting a leading edge of the lamina. One example of a suitable sensor is a reflective LED sensor. In order for the sensors 118, 120 to detect the lamina at the mounted position, the lamina guide members must have a cut-outs 126, 128.

The drive assemblies 122, 124 are mounted to a common backplate 130 which is in turn mounted to the frame 25. Each of the drive assemblies 122, 124 comprises a drive motor 132, 133 and a gear train generally indicated at 134, 136 (FIG. 10) interconnecting the drive motors with the respective transfer rollers and the respective nip rollers. Each gear train 134, 136 is constructed identically and is arranged to rotate the outer surface of the transfer roller at a greater speed than the outer surface of the drive roller of the nip such that the transfer roller pulls the web along the lamina supply path faster than the nip pushes the web. The pulling action will be further described hereinbelow with respect to operation of the apparatus. The drive roller 86 of each nip 38, 40 includes a one-way clutch 138 which allows free rotation of the drive roller 86 only in the downstream direction. This arrangement prevents the nip from advancing the web too quickly, allows the transfer roller to pull the web through the lamina supply path rather than pushing the lamina, and also provides a gap between the trailing edge of the cut sheet of laminate and the leading edge of the web. The gap allows the lamina sensors 118, 120 to more accurately detect the leading edge of the web and to stop rotation of the transfer roller at the proper time. More specifically, the gear trains 122, 124 each comprises a drive gear 140, 142 attached to the respective drive motor 132, 133, a transfer roller gear 144, 146 attached to the transfer roller 88, 90, a reduction gear 148, 150 disposed between the respective drive gear and the respective transfer gear, a drive nip gear 152, 154, and an idler gear 156, 158 disposed between the respective transfer roller gear and the respective drive nip gear. It can be seen that rotation of the drive gear 140, 142 causes corresponding rotation of both the transfer rollers 88, 90 and the drive nip rollers 86. Drive motors 132, 133 are energized independently of one another.

The substrate 16 is automatically transported along the substrate supply path 26 by pairs of input nip rollers 160, the heated nip rollers 108, 110 and an output pair of nip rollers 162, all of which are constantly rotated by a separate drive motor (not shown).

Referring back to FIGS. 1–4 operation of the apparatus 10 will be described in detail. The webs of lamina 26, 28 are advanced downstream by the nip rollers 38, 40 where they is captured by the transfer rollers 88, 90. As described above, the transfer rollers 88, 90 are driven at a greater speed than the nip rollers 38, 40 wherein the transfer roller 88, 90 now pulls the respective web of lamina 26, 28 faster than the nip rollers 38, 40 advance the web. The lamina sensors 118, 120, are positioned on the circumference of the transfer rollers 88, 90 at a position wherein the distance between the sensor 118, 120 and the cutter 34, 36 equals the desired length of the sheet of the laminate 12, 14. When the sensor 118, 120 senses the leading edge of the lamina 26, 28, rotation of the drive assemblies 122, 124 are stopped, and the cutter 34, 36 actuated to sever a sheet of laminate 12, 14 from the web. The operation is identical for both laminating assemblies, although both assemblies operate independently from each other responsive to the respective sensor 118, 120. When both sheets of laminate 12,14 are ready for transfer (FIG. 1), the substrate 16 is inserted into input nip 160 and advanced along the substrate supply path 26 toward the convergence zone. A substrate sensor 164 is positioned along the substrate supply path 26 to detect the leading edge of the substrate 16. The substrate sensor 162 can comprise any sensor suitable for detecting the leading edge of the substrate, such as a reflective LED sensor. When the substrate sensor 164 detects the leading edge of the substrate 16, the drive assemblies are energized and rotation of the transfer rollers and nip rollers resume simultaneously. The timing of advancement of the substrate 16 and rotation of the transfer rollers 88, 90 is such that the leading edges of the laminate 12, 14 reach a convergence point at the same time as the leading edge of the substrate 16 (See FIG. 2). As the transfer rollers 88, 90 continue to rotate, the stripper fingers on the transfer members 100, 102 strip the laminate sheets 12, 14 from the surface of the transfer rollers 88, 90 and force the laminate sheets 12, 14 into overlying relation with the substrate 16.

Figure 3:
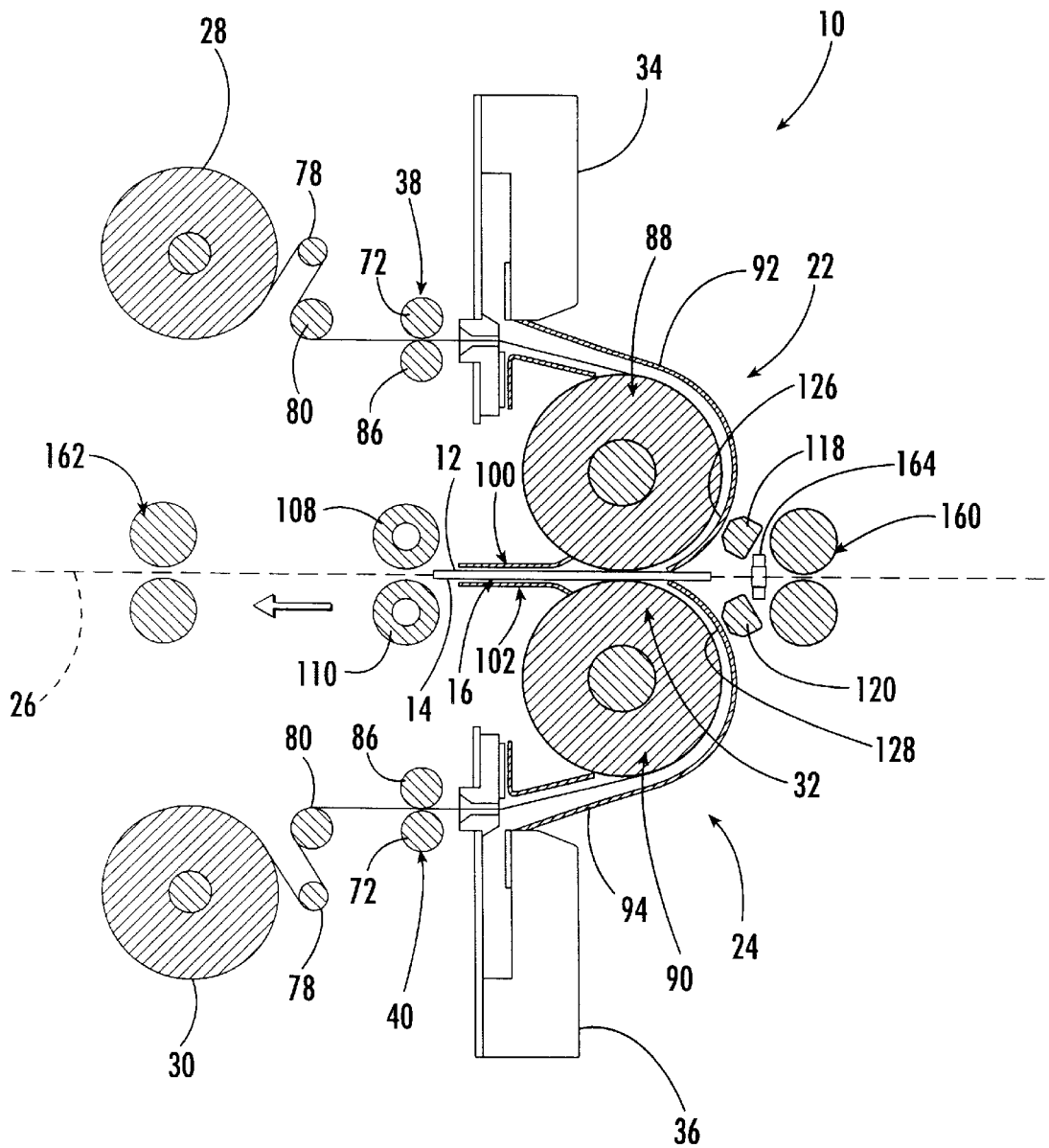
FIG. 3 is still another plan view thereof showing transfer of the cut laminate sheets onto upper and lower sides of the card substrate.
Figure 4:
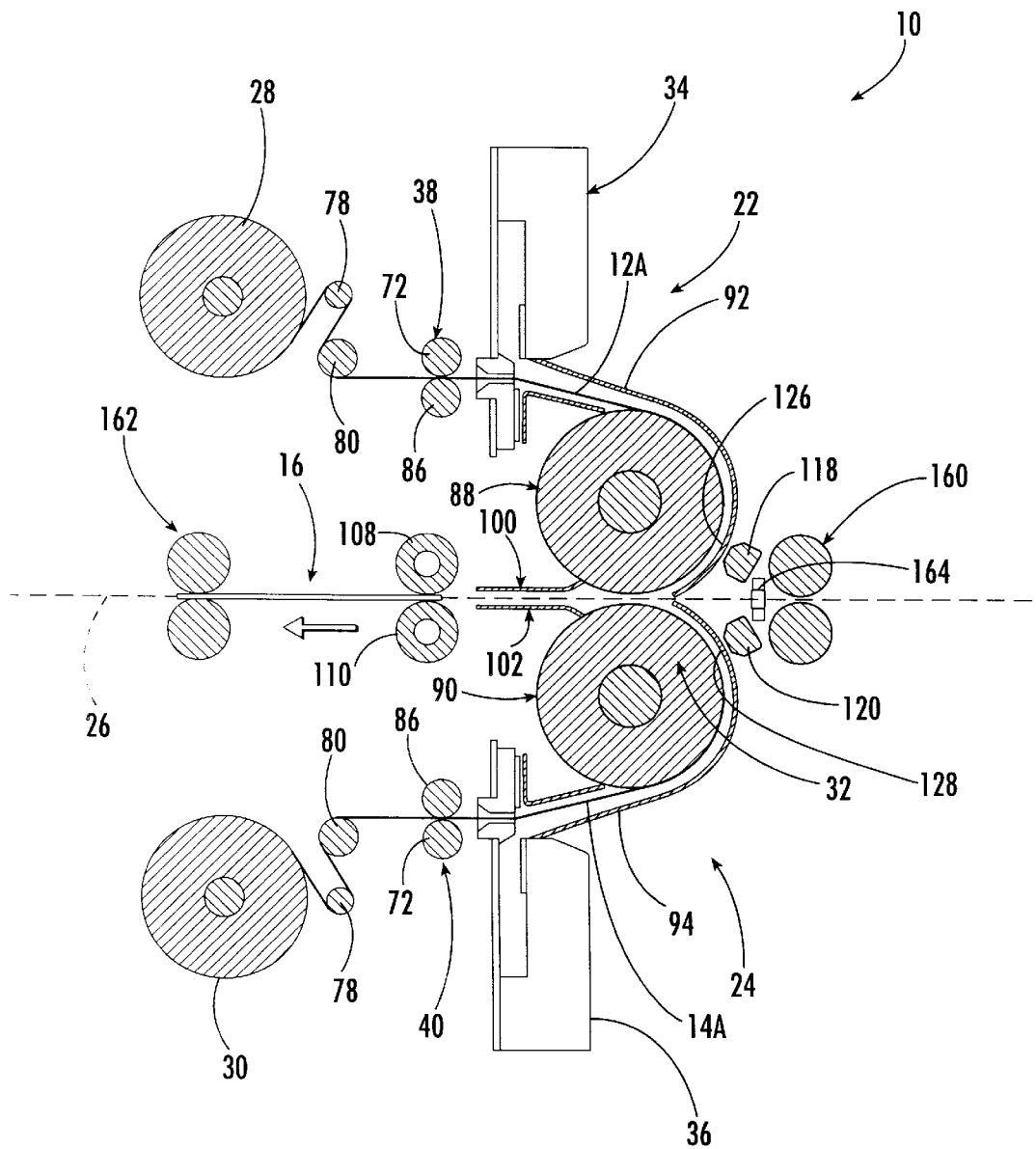
FIG. 4 is a yet another plan view thereof showing advancement of the card through the heated nip rollers and advancement of new laminate sheets onto the transfer rollers.

Since the nip rollers 38, 40 are driven by the same motors as the transfer roller 88, 90, the nip rollers 38, 40 are also advancing the web 26, 28 (See also FIG. 2) until the new leading edge of the web 26, 28 is captured by the input portion of transfer roller 88, 90 (See FIG. 3). The drive assembly continues to operate until the lamina sensor 118, 120 detects the leading edge of the lamina 26, 28 (See FIG. 4). Thereafter, the drive motors are shut off and the cutter 34, 36 is actuated to sever new sheets of laminate 12A, 14A from the webs 26, 28 (FIG. 4). As indicated above, since the transfer roller 88, 90 advances faster than the nip rollers 38, 40 advance the web, a small gap 166 forms between the trailing edge of the sheet of laminate being transferred and the new web of lamina being fed from the nip (See FIGS. 2 and 3). As the substrate 16 exits the convergence zone 32, the leading edge of the substrate 16 is immediately captured between two heated nip rollers 108, 110 to heat bond the laminate sheets to the substrate. The heated nip rollers include a non-rotating heated core and a rotating outer surface. The heaters are symmetrically positioned in mirror image relation to form a nip.

It can therefore be seen that the present invention provides an improved card laminating apparatus which simultaneously applies laminate sheets to both sides of a card substrate. The provision of mirror image laminating assemblies mounted in symmetrical mirror image relation on both sides of a substrate supply path minimizes the length of the substrate supply path, performs two simultaneous operations and reduces card production time significantly. The unique transfer and drive assemblies insure proper feeding, transfer and registration of the cut laminate sheets onto the opposing surfaces of the card substrate during operation. Mounting of the heating rollers in opposing relation to form a heated nip provides even heating of the substrate and laminate sheets to reduce card curl, and eliminate the need for a mechanical card straightener. For these reasons, the instant invention is believed to represent a significant advancement in the art which has substantial commercial merit.

While there is shown and descreibed herein certain specific structure embodying the invention, it will be manifest to those skilled in the art that various modification and rearrangements of the parts may be made without departing from the spirit and scope of the underlying inventive concept and that the same is not limited to the particular forms herein shown and described except insofar as indicated by the scope of the appended claims.

What is claimed is:

1. A laminating apparatus for applying a laminate overlay sheet to a face of a substrate, said apparatus comprising:
   a web of lamina;
   a cutter configured to cut sheets of laminate from said web of lamina;
   a pair of nip rollers disposed between the web of lamina and the cutter, said pair of nip rollers including a drive roller and an idle roller, said web of lamina passing between the pair of nip rollers, said nip rollers configured to selectively advance the web of lamina in an upstream direction through the cutter so that a leading edge of the web of lamina is downstream of the cutter;
   a convergence zone at which a cut sheet of laminate and a substrate are brought into overlying registration;
   a transfer roller disposed between the cutter and the convergence zone, said transfer roller having an outer surface which passes through the convergence zone;
   a spring metal laminate guide member extending between the cutter and the convergence zone, said laminate guide member having a portion thereof formed in an arc corresponding to said outer surface of said transfer roller wherein the laminate guide member and the outer surface of the transfer roller cooperate to form a laminate supply path extending between the cutter and the convergence zone, said outer surface of said transfer roller having an elastomeric member disposed thereon, said elastomeric member frictionally capturing said web of lamina, said transfer roller being selectively rotated to pull the leading edge of said web of lamina in an upstream direction along the laminate supply path from the cutter toward the convergence zone, said cutter selectively cutting a sheet of laminate from the web of lamina while said web of lamina is captured on said transfer roller;

a transfer member disposed in the convergence zone, said transfer member configured to cooperate with the outer surface of the transfer roller during further rotation of the transfer roller to remove a leading edge of the sheet of laminate from the outer surface of the transfer roller and to transfer the sheet of laminate into overlying registration with the substrate;

a substrate transport device configured to selectively transport the substrate through the convergence zone beneath the transfer member;

a heater disposed downstream of the convergence zone, said substrate transport device transporting said substrate through said heater; and a control configured to control the substrate transport device, the nip rollers, the cutter and the transfer roller.

2. The laminating apparatus of claim 1 wherein said web of lamina is mounted in a cassette, said cassette having an output zone, said drive roller being mounted on a frame of said apparatus, said idle roller being mounted on said cassette, said web of lamina being captured between said drive roller and said idle roller when the cassette is mounted on the frame.

3. The laminating apparatus of claim 1 wherein the transfer roller pulls the web along the lamina supply path faster than the pair of nip rollers advances the web.

4. The laminating apparatus of claim 1 further comprising a drive motor, and a gear train interconnecting the drive motor with the transfer roller and the drive roller of the nip rollers.

5. The laminating apparatus of claim 3 further comprising a drive motor, and a gear train interconnecting the drive motor with the transfer roller and the drive roller of the nip rollers.

6. The laminating apparatus of claim 5 where in s aid drive roller of the nip rollers includes a one-way clutch which allows free rotation of the drive roller in the downstream direction.

7. The laminating apparatus of claim 6 wherein the gear train is constructed and arranged to rotate an outer surface of the transfer roller at a greater speed than an outer surface of the drive roller of the nip rollers wherein the transfer roller pulls the web along the lamina supply path faster than the drive roller pushes the web.

8. The laminating apparatus of claim 1 wherein said transfer roller comprises a cylindrical core, and a plurality of resilient O-rings extending around the circumference of the cylindrical core, said O-rings projecting above an outer surface of the cylindrical core.

9. The laminating apparatus of claim 8 wherein transfer member comprises a plate having a plurality of spaced fingers extending outwardly from a leading edge thereof, said fingers being disposed is closely spaced adjacent relation to an outer surface of the core of the transfer roller, said fingers extending between the projecting O-rings such that said fingers strip the laminate sheet away from the O-rings as the laminate sheet enters the convergence zone.

10. A two-sided laminating apparatus for applying laminate overlay sheets to opposing faces of a two-sided substrate, said apparatus comprising:

first and second laminating assemblies symmetrically mounted in mirror image relation on opposing sides of a substrate supply path, said substrate supply path including a convergence zone at which opposing sheets of laminate are brought together in overlying relation with the opposing faces of the substrate, each of said laminating assemblies comprising a web of lamina;

a cutter configured to cut sheets of laminate from said web of lamina;

a pair of nip rollers disposed between the web of lamina and the cutter, said pair of nip rollers including a drive roller and an idle roller, said web of lamina passing between the pair of nip rollers, said pair of nip rollers configured to selectively advance the web of lamina in an upstream direction through the cutters so that a leading edge of the web is downstream of the cutter;

a transfer roller disposed between the cutter and the convergence zone, said transfer roller having an outer surface which passes through the convergence zone;

a spring metal laminate guide member extending between the cutter and the convergence zone, said laminate guide member having a portion thereof formed in an arc corresponding to said outer surface of said transfer roller wherein the laminate guide member and the outer surface of the transfer roller cooperate to form a laminate supply path extending between the cutter and the convergence zone, said outer surface of said transfer roller having an elastomeric member disposed thereon, said elastomeric member frictionally capturing said web of lamina, said transfer roller being selectively rotated to pull the leading edge of the web of lamina in an upstream direction along the laminate supply path from the cutter toward the convergence zone, said cutter selectively cutting a sheet of laminate from the web of lamina while said web of lamina is captured on said transfer roller;

a transfer member disposed in the convergence zone in adjacent relation to the transfer roller, said transfer member configured to cooperate with the outer surface of the transfer roller during further rotation of the transfer roller to strip a leading edge of the sheet of laminate from the outer surface of the transfer roller and transfer the sheet of laminate into overlying registration with the substrate; and a heater disposed downstream of the convergence zone;

a substrate transport device configured to transport the substrate along the substrate supply path, said substrate passing through the convergence zone and between the respective transfer members of each laminating assembly wherein the laminate sheets are applied to the opposing faces of the substrate as the substrate passes through the convergence zone, said substrate transport device thereafter transporting said substrate further along said substrate supply path between said heaters wherein the laminate sheets are bonded to the substrate; and a control configured to control the substrate transport device, the nip rollers, the cutter and the transfer roller.

11. The two-sided laminating apparatus of claim 10 wherein each of said webs of lamina are mounted in a cassette, said cassette having an output zone, said drive roller being mounted on a frame of said apparatus, said idle roller being mounted on said cassette, said web of lamina being captured between said drive roller and said idle roller when the cassette is mounted on the frame.

12. The two-sided laminating apparatus of claim 10 wherein each of the transfer rollers pulls the web of lamina faster than the associated pair of nip rollers advances the web.

13. The two-sided laminating apparatus of claim 10 wherein each of said laminating assemblies further comprises a drive motor, and a gear train interconnecting the drive motor with the respective transfer roller and the drive roller of the associated nip rollers.

14. The two-sided laminating apparatus of claim 12 wherein each of said laminating assemblies further comprises a drive motor, and a gear train interconnecting the drive motor with the respective transfer roller and the drive roller of the associated nip rollers.

15. The two-sided laminating apparatus of claim 14 wherein each of said drive rollers includes a one-way clutch which allows free rotation of the drive roller in the downstream direction.

16. The two-sided laminating apparatus of claim 15 wherein each of the gear trains is constructed and arranged to drive the outer surface of the respective transfer roller at a greater speed than an outer surface of the drive roller of the associated nip rollers such that the transfer rolls pulls the web faster than the drive roller pushes the web.

17. The two-sided laminating apparatus of claim 10 wherein each of said transfer rollers comprises a cylindrical core, and a plurality of resilient O-rings extending around the circumference of the cylindrical core, said O-rings projecting above an outer surface of the cylindrical core.

18. The two-sided laminating apparatus of claim 17 wherein each of the transfer members comprises a plate having a plurality of spaced fingers extending outwardly from a leading edge thereof, said fingers being disposed is closely spaced adjacent relation to outer surface of the core of the transfer roller, said fingers extending between the projecting O-rings such that said fingers are effective for stripping the laminate sheet away from the O-rings as the laminate sheet enters the convergence zone.

19. A laminate transport apparatus for applying a sheet of lamina to a face of a substrate, said apparatus comprising:

a convergence zone at which a sheet of laminate and a substrate are brought together in overlying registration;

a transfer roller having an outer surface which passes through the convergence zone, said transfer roller including a cylindrical core, and a plurality of resilient O-rings extending around the circumference of the cylindrical core, said O-rings projecting above an outer surface of the cylindrical core;

a laminate guide member having a portion thereof formed in an arc corresponding to said outer surface of said transfer roller, said laminate guide member having a downstream end for receiving a leading edge of said sheet of laminate and an upstream end terminating at said convergence zone, said laminate guide member curving around at least a portion of said outer surface of said transfer roller to form a laminate supply path extending from said downstream end of said guide member to said convergence zone;

a laminate advancer mounted adjacent to the downstream end of said laminate guide member, said laminate advancer configured to advance leading edge of said sheet of laminate into said laminate supply path, said transfer roller being configured to frictionally grab the leading edge of said sheet of laminate and pull said sheet of laminate in an upstream direction to said convergence zone; and a transfer member disposed in the convergence zone configured to transfer said leading edge of said sheet of laminate from the outer surface of said roller into overlying registration with a corresponding surface of said substrate.

20. The laminating apparatus of claim 19 wherein the transfer member comprises a plate having a plurality of spaced fingers, said fingers being disposed adjacent to an outer surface of the core of the transfer roller, said fingers extending between the projecting O-rings such that said fingers strip said sheet of laminate away from the transfer roller.

* * * * *